United States Patent [19]

Schwartzott

[11] Patent Number: 4,654,969

[45] Date of Patent: Apr. 7, 1987

[54] CUTTING MACHINE FOR FLAT MATERIAL

[75] Inventor: John M. Schwartzott, Norcross, Ga.

[73] Assignee: Krauss u. Reichert GmbH & Co. KG, Fed. Rep. of Germany

[21] Appl. No.: 862,966

[22] Filed: May 14, 1986

[51] Int. Cl.$^4$ .......................... B26B 15/00; B26D 5/10

[52] U.S. Cl. .................................... 30/275; 30/123.3; 83/169

[58] Field of Search .................. 30/123.3, 275, 273; 83/171, 169

[56] References Cited

U.S. PATENT DOCUMENTS

| | | | |
|---|---|---|---|
| 767,076 | 8/1904 | Mattison | 30/123.3 |
| 2,590,725 | 3/1952 | Sanger | 83/169 X |
| 2,810,954 | 10/1957 | Clark | 30/123.3 |
| 2,937,442 | 5/1960 | Beaver | 30/275 X |
| 3,001,287 | 9/1961 | Rocovich | 30/275 X |
| 3,346,954 | 10/1967 | Ulrich | 30/273 |
| 3,577,808 | 5/1971 | Visser | 83/169 X |
| 4,107,839 | 8/1978 | Jung | 30/123.3 |

*Primary Examiner*—Jimmy C. Peters
*Attorney, Agent, or Firm*—Leydig, Voit & Mayer

[57] ABSTRACT

The disclosure describes a cutting machine for flat material, such as fabrics, sheeting and the like, with a compressed-air-cooled trivot, a trivot drive which is supported on a foot plate by means of a support such as a column, two blade guides having the shape of flat strips being disposed at the support, said blade guides delimiting a gap in which is guided the trivot, which oscillates parallel to the longitudinal direction of the support, a cooling channel extending in the support approximately parallel to the trivot and running more or less the length of the support, a compressed-air-operated vortex tube connected to the cooling channel, and a means for introducing cooling air into the cooling channel for cooling the trivot, blade guides, and support.

6 Claims, 7 Drawing Figures

CUTTING MACHINE FOR FLAT MATERIAL

The invention relates to a cutting machine for flat material, such as fabrics, sheeting and the like, with a compressed-air-cooled trivet and a trivet drive which is supported on a foot plate by means of a support, two blade guides having the shape of flat strips being disposed at the support, said blade guides delimiting a gap in which is guided the trivet, which oscillates parallel to the longitudinal direction of the support, and with a cooling channel extending in the support approximately parallel to the trivet and running more or less the length of said support, the cooling air being introducible into said cooling channel for cooling trivet, blade guides and support.

In cutting machines with a trivet mounted in a gap between blade guides, the trivet becomes quite hot in particular when cutting curves, which without special cooling results in the trivet and the blade guides, as well as the support, becoming so hot that they tarnish. This not only adversely affects the strength of the material, but the flat material to be cut can be damaged.

A cutting machine of the aforementioned type has therefore already become known (GB-PS No. 1 394 668), in which the support comprises at the top a compressed-air connection which communicates with the cooling channel. The cooling channel is sealed at the bottom in the area of the foot plate, but branched-off holes are provided in the support between this seal and the compressed-air connection at equal intervals, said branch-off holes leading from the cooling channel to the blade guides. The latter are formed by a profiled strip which is U-shaped in cross-section, and whose back has for each branch-off hole a notch from which grooves provided in the outer side surfaces of the profiled strip issue radially on both sides. Support, blade guides and, indirectly, the trivet are cooled by the compressed air in this way.

Since the working speeds of modern trivet-type cutting machines are now getting ever greater, the users are demanding a more intensive cooling system.

The object of the invention therefore was to improve the above-described known cutting machine so that far more intensive cooling is achieved without substantial additional outlay. Taking as a basis a cutting machine of the initially mentioned type, according to the invention this object can be realized by equipping the cutting machine with a compressed-air-operated vortex tube, connected to the cooling channel, for the production of cold air. With such a known vortex tube it is possible substantially to cool compressed air without moving parts, so that for effective cooling even a simple cooling channel extending along the support and with a cold-air throughflow is sufficient, since the support is cooled to such a degree that as a result of the heat conduction between support, the blade guides and the trivet, even the latter is cooled sufficiently. In a preferred embodiment of the cutting machine according to the invention, the blade guides are provided with channels which are connected to the cooling channel of the support and have air outlets facing the trivet. In this way, not only the blade guides, but also the trivet are cooled directly.

In another embodiment the support comprises a plurality of side channels which are disposed at a distance from each other, branch off from the cooling channel and extend in the direction of the trivet, and furthermore there is provided a spacing strip disposed behind the trivet between the blade guides, said spacing strip comprising transverse channels which connect the side channels of the cooling channel to the gap in order to accommodate the trivet. In this embodiment the spacing strip is cooled directly; the latter also cools rear areas of the blade guides by heat conduction. Furthermore, the cold air is supplied directly to the gap for accommodating the trivet, thus also enabling direct cooling of the contact surfaces of trivet and blade guides, said contact surfaces running against each other during operation being responsible for the generation of heat. It is practical for this embodiment to be so designed that the spacing strip has, on its side facing the support, longitudinal channels extending parallel to the trivet, into which longitudinal channels the side channels of the cooling channel join and from which the transverse channels of the spacing strip emanate. These longitudinal channels serve as cold-air distributor channels in the longitudinal direction of the spacing strip, so that for each longitudinal channel at least one side channel is required for the supply of cold air, the cold air being distributed through the longitudinal channel to the various transverse channels.

The trivet is guided only with very small clearance in the gap between the blade guides, so that the cross-section is normally not sufficient for the discharge of the cold air introduced into this gap. For this reason it is advantageous if the trivet has transverse grooves which allow discharge of the cold air from the reverse side of the trivent in the direction of its cutting edge. As a result the cold air flows also along the side surfaces of the trivet and along the surfaces of the blade guides which guide these side surfaces, i.e. along areas in which in particular in cutting curves the greatest generation of heat occurs, so that in this embodiment direct cooling of the areas most affected by the generation of heat takes place. As an alternative to the transverse grooves disposed in the trivet, however, the blade guides, too, can be provided with transverse grooves in order to achieve the same result.

Hereinafter the invention is to be explained in more detail with reference to a particularly preferred embodiment shown in the enclosed drawings, in which.

Figure 1:
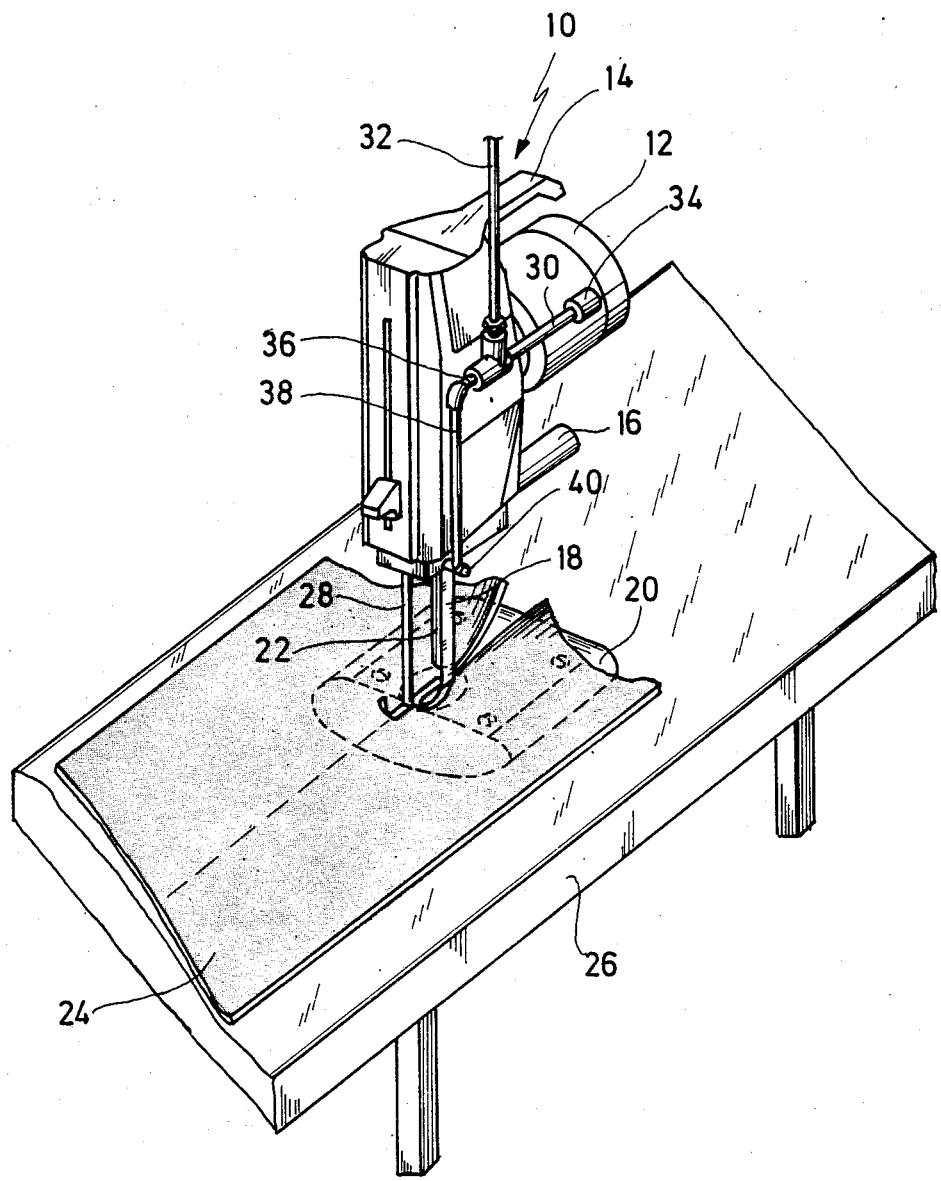
FIG. 1 is a perspective view of a cutting machine with trivet.
Figure 2:
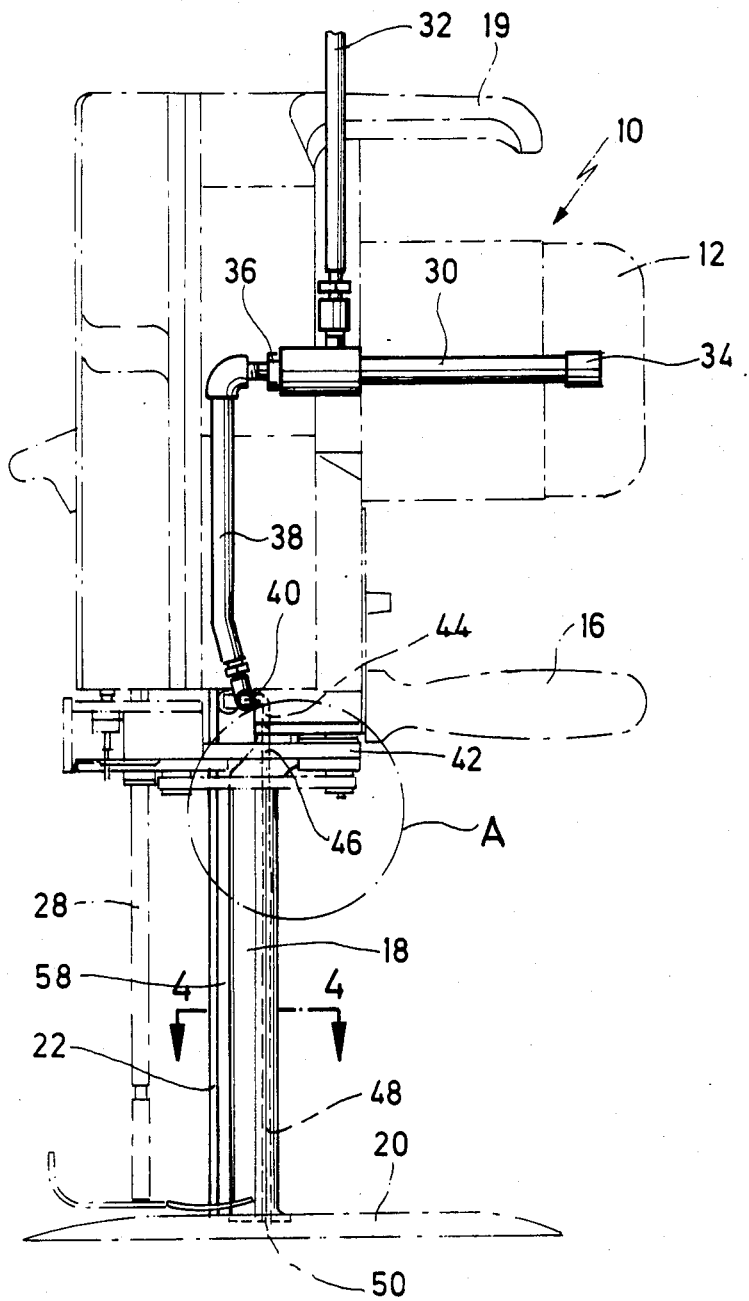
FIG. 2 is a side view of the machine in FIG. 1.
Figure 3:
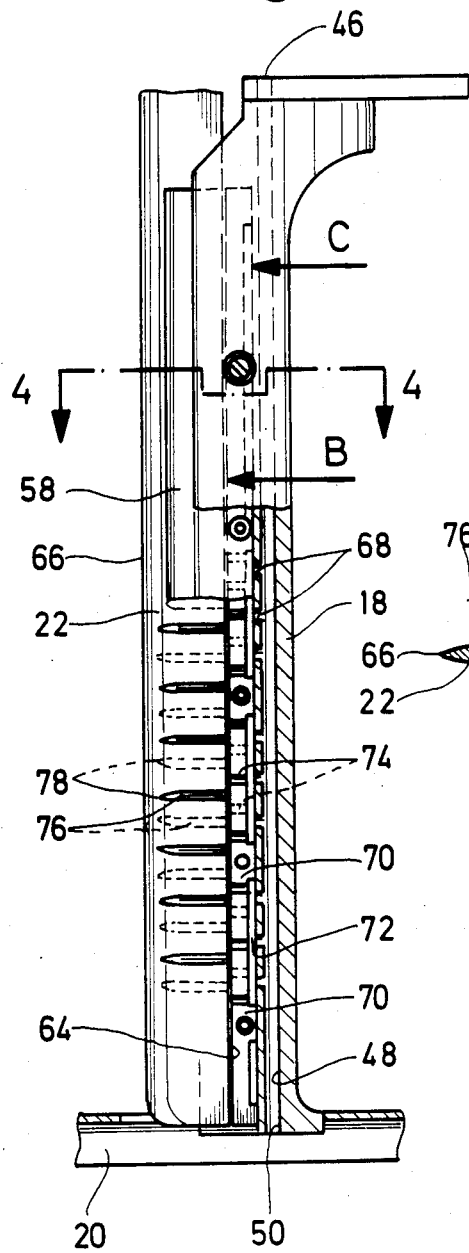
FIG. 3 is a cutaway side view of a support.
Figure 4:
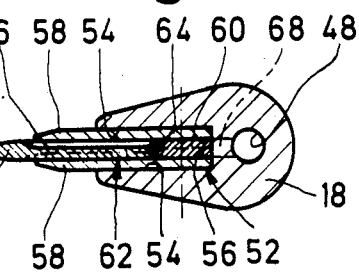
FIG. 4 is a section along Line 4—4 in FIG. 3.
Figures 5, 6:
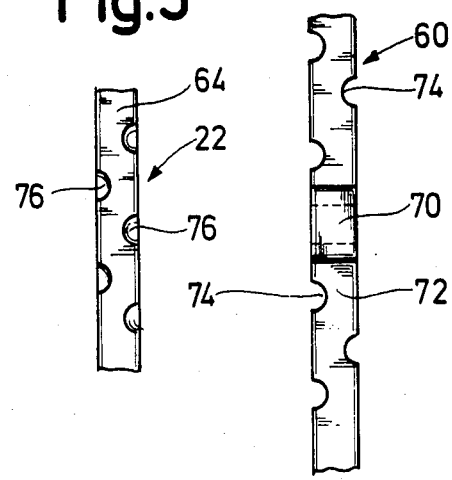
FIG. 5 is a view of a trivet in the direction of arrow B in FIG. 3.
FIG. 6 is a view of a spacing strip in the direction of arrow C in FIG. 3.

More specifically, FIG. 1 shows a cutting machine, the entirety of which is designated as 10, with a housing 12 for accommodating a trivet drive which has two guide grips 14 and 16 pointing backwards contrary to a cutting direction. Extending vertically downward on housing 12 is held a support 18, by means of which the housing 12 is supported on a foot plate 20 mounted at a bottom end of the support 18. On a front side (as viewed in the cutting direction) of the support 18 there is a slidably mounted trivet 22 oscillating in a vertical direction. When cutting a ply of fabric 24 the cutting machine 10 glides on the foot plate 20, which bears the latter, across a cutting table 26, whereby the oscillating trivet 22 cuts a ply of fabric 24, held down by means of a presser foot 28, along a cutting line indicated by a dotted line in FIG. 1.

Figure 7:
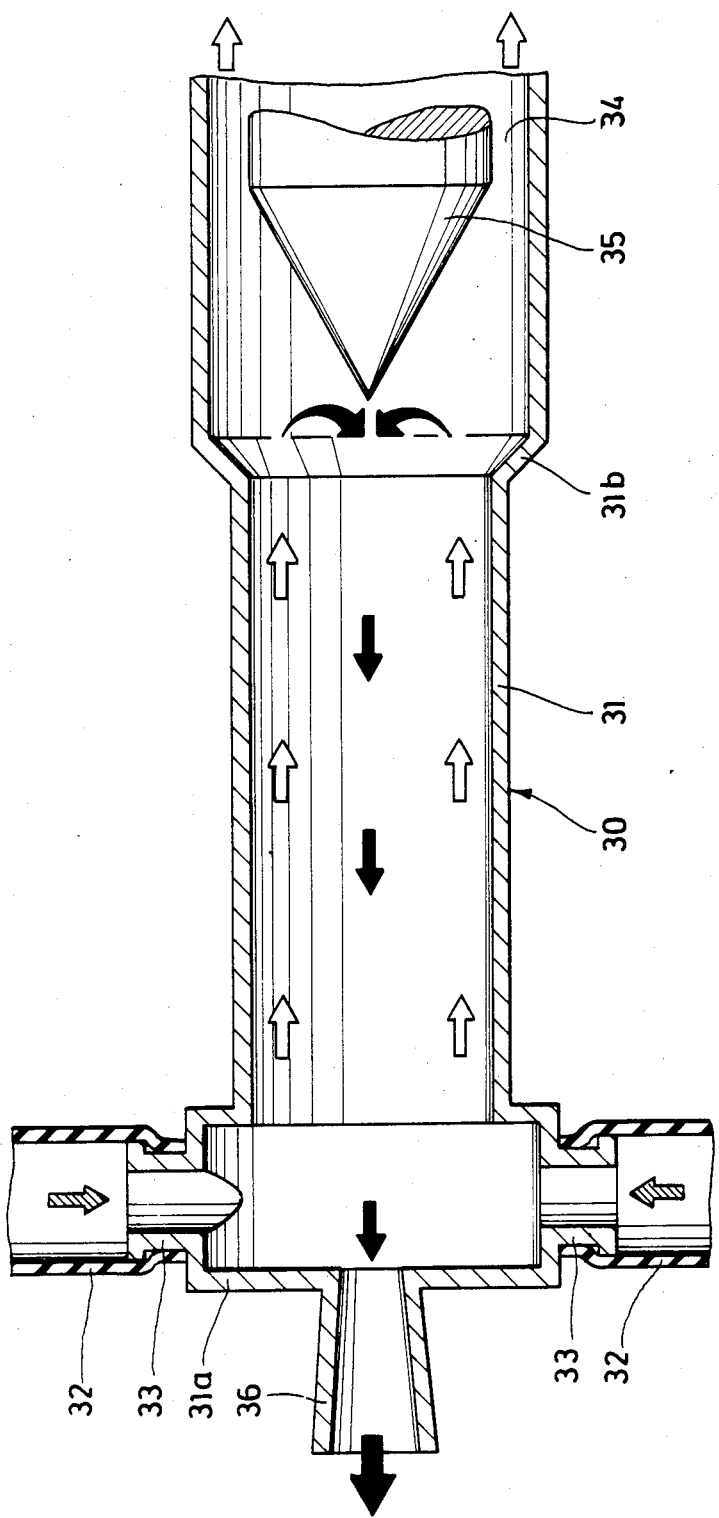
FIG. 7 is a diagrammatic view of the vortex tube used for the production of cold air.

For the production of cold air for cooling the support 18 and the trivet 22, a compressed-air-operated vortex tube 30 (e.g. VORTEX TUBE made by the Vortec Corporation, Cincinatti, Ohio 45242, USA) is mounted on the housing 12, said vortex tube lying parallel to the guide grips 14 and 16 in this embodiment. Compressed air at a pressure of approx. 5 to 8 bar is suppliable from a pressure-regulation and filter device (not shown in the drawing) via a compressed-air tube 32 to the vortex tube which is shown in FIG. 7, and which will be explained in greater detail below. The vortex tube 30 has a hot-air outlet 34 and a cold-air outlet 36, the hot-air outlet 34 being equipped with a control valve 35 for controlling the quantity of hot air discharged. A cold-air pipe 38 extends from the cold-air outlet 36 to a collar 40 disposed on the housing 12 above an upper flange 42 of the support 18. A bent pipe 44 leads from this collar 40 to an intake hole 46 disposed in the flange 42, said intake hole being in alignment with a cooling channel 48 located in a rear part of the support 18 (as seen in the direction of cutting), said cooling channel 48 extending along the entire length of the support 18 from the intake hole 46 to an outlet 50 on an underside of the foot plate 20.

The trivet 22 is slidably mounted on the support 18 by means of a groove 52 extending, as seen in the direction of cutting, on the front side of this support 18 along the entire length of the latter and open at the front, said groove 52 having two side surfaces 54 lying parallel to the direction of cutting and a rear wall surface 56 lying at right angles to the direction of cutting, there being mounted in said wall surface 56 two flat-strip-shaped blade guides 58, each of which is in contact with a different one of the side surfaces 54, extends forward from the rear wall surface 56 and projects beyond the groove 52. Between these blade guides 58 there is a spacing strip 60 arranged in a rear part of the groove 52, said spacing strip being in contact with the rear wall surface 56 of the groove 52 and extending forward from there only over part of the groove 52. The blade guides 58 form a gap 52 for accommodating the trivet 22 which in said gap undergoes lateral guidance by means of the blade guides 58 and is supported on the spacing strip 60 by a rear surface 64 lying on the opposite side of a cutting edge.

For direct cooling of the blade guides 58 and of the trivet 22, within the support 18 side channels 68 branch off from the cooling channel 48, said side channels joining into the groove 52 and having outlets in the area of the rear wall surface 56. The spacing strip 60 is provided in its area contact said wall surface with a plurality of recesses extending in its longitudinal direction, so that it is supported on the wall surface 56 in its longitudinal direction only by means of projections 70 which lie between the recesses, and longitudinal channels 72 are produced between these projections 70, said longitudinal channels serving as vertical distributor channels for the cold air supplied via the side channels 68, the cold air escaping from the longitudinal channels 72 via transverse channels 74 into the gap 62.

These transverse channels 74 are preferably milled or ground in the form of grooves on both sides of the spacing strip 60 contacting the blade guides 58, one transverse channel 74 on one side being following by the next transverse channel 74 on the opposite side, as seen in the longitudinal direction of the spacing strip, i.e. the transverse channels 74 are disposed alternately on opposite sides of the spacing strip 60.

In order to allow the cold air supplied to the gap 62 to escape, transverse grooves 76, likewise alternating, are milled or ground into the trivet 22 on both sides contacting the blade guides 58, said transverse grooves 76 extending from the back surface 64 of the trivet 22 in the direction of the latter's cutting edge 66 and the front ends 78 of said transverse grooves 76 being located in the area of front edges of the blade guides 58 or between the front edges of the blade guides 58 and the cutting edge 66, so that the cold air can escape forward unobstructed.

If necessary, the outlet 50 of the cooling channel 48 is further provided with a choke valve or even a stopper, so that almost the entire cold air supplied to the cooling channel 48 escapes at the front ends 78 of the transverse grooves 76 of the trivet 22.

As can be seen from FIG. 7, the vortex tube 30 essentially consists of a cylindrical tube 31 on whose one left-hand end, as shown in FIG. 7, are disposed several nozzles 33 distributed over the circumference of the tube, the axes of said nozzles 33 not extending radially with respect to the longitudinal axis of the tube 31, but joining into the tube 31 at such an angle that the compressed air supplied via these nozzles into the tube 31 first results in an air current within the tube, said current being in the circumferential direction of the tube. As has been indicated in FIG. 7, the nozzles 33 are connected to the compressed-air tube 32. To the left of the nozzles 33 the tube 31 is sealed by means of a face wall 31*a*, which has a hole for the cold-air outlet 36. The right-hand end of the tube 31, as shown in FIG. 7, forms the hot-air outlet 34, in which is disposed a valve element 35, slidable in the direction of the axis of the tube 31, said valve element forming together with the wall of the tube 31 the above-mentioned control valve. A tapered section 31*b* of the tube 31 cooperates with the valve element 35 in such a manner that through the sliding of the valve element 35 the effective outlet cross-section for the hot-air outlet 34 is reduced—the valve element 35 is of the shape of a cone.

The vortex tube 30 has the capacity to divide the compressed air supplied to it by means of the compressed-air tube 32 into a cold-air and a hot-air flow. In FIG. 7, the hot-air and the cold-air flows have been indicated by means of white and black across respectively. Through the almost tangential introduction of the compressed air by means of the nozzles 33, the compressed-air flow on the inside of the tube 31 forms circular vortices which move in the direction of the white arrows along the tube 31, whereby the air of the areas of the vortex flow directly adjoining the inner wall of the tube 31 is heated and this heated air leaves the vortex tube 30 through the hot-air outlet 34. Through the choke valve formed by means of the valve element 35, sufficient pressure builds up within the vortex tube to induce the areas of the air flow nearer the center of the tube 31 to flow back from the valve element 35 in the center of the tube 31, and this air flowing to the cold-air outlet 36 is substantially cooled.

The cold-air flow is supplied to the cooling channel 48 from the cold-air outlet 36 by means of the cold-air pipe 38 via the collar 40 and the tube 44. The temperature and quantity of the cold air is at the same time further adjustable by sliding the valve element 35.

In the cooling channel 48, the cold air can either flow out of its outlet 50 or get into the gap 62 via the side channels 68, the longitudinal channels 72 and the transverse channels 74 emanating therefrom. On this route through the support 18 and the spacing strip 60 a heat exchange already takes place, so that the above-mentioned parts are cooled, which for their part again are in mechanical contact with the blade guides 58, and likewise cool the latter by means of heat-conduction effects. In addition, the cold air supplied to the gap 62 and flowing off via the transverse grooves 76 results in a further direct cooling of all friction surfaces of the trivet 22 in the gap 62.

Still further embodiments of the cutting machine according to the invention are conceivable, in which the cold air, starting from leaving the cooling channel 48, is routed through differently routed channels.

A simple modification to the cutting machine according to the invention consists in the transverse grooves for the discharge of the cold air out of the gap 62 being incorporated not in side surfaces of the trivet 22 but in side surfaces of the blade guides 58 contacting the latter, and extending over the entire width of the blade guides 58, the result being that the transverse grooves 76 and the transverse channels 74 are replaceable.

What is claimed is:

1. A cutting machine for flat material, such as fabrics, foils and the like, the cutting machine comprising a blade like knife, drive means for vertically oscillating said knife, a foot plate, column means bearing against the foot plate for supporting the drive means, two knife guides having the shape of flat strips being disposed at the column, said guides delimiting a gap in which the knife is guided for oscillating parallel to the longitudinal direction of the column, a cooling channel extending in the column approximately parallel to the knife and substantially over the length of said column, means for introducing cooling air into said cooling channel for cooling the knife guides and column, and a compressed-air-operated vortex tube connected to the cooling channel.

2. Cutting machine as defined in claim 1, wherein said guides are provided with channels which are connected to the cooling channel of the column and which have air outlets facing the knife.

3. Device as defined in claim 1, wherein the column comprises a plurality of side channels, said side channels being disposed at a distance from each other, branching off from the cooling channel and extending in the direction to the knife, and wherein a spacing strip disposed behind the knife between said guides (58) comprises transverse channels which connect the side channels of the cooling channel to the gap accomodating the knife.

4. Cutting machine as defined in claim 3, wherein, on its side facing the column, the spacing strip has longitudinal channels extending parallel to the knife, into which longitudinal channels join the side channels of the cooling channel and from which the transverse channels of the spacing strip emanate.

5. Cutting machine as defined in claim 1, wherein the knife has transverse grooves.

6. Cutting machine as defined in claim 1, wherein said guides comprise transverse grooves.

* * * * *